(12) United States Patent
Lin et al.

(10) Patent No.: US 12,529,185 B2
(45) Date of Patent: Jan. 20, 2026

(54) ARTIFICIAL LEATHER AND METHOD FOR PRODUCING THE SAME

(71) Applicant: SAN FANG CHEMICAL INDUSTRY CO., LTD., Kaohsiung (TW)

(72) Inventors: Chih-Yi Lin, Kaohsiung (TW); Kuo-Kuang Cheng, Kaohsiung (TW); Chien-Chia Huang, Kaohsiung (TW); Chia-Ho Lin, Kaohsiung (TW); Chieh Lee, Kaohsiung (TW); Wei-Ling Chen, Kaohsiung (TW)

(73) Assignee: SAN FANG CHEMICAL INDUSTRY CO., LTD., Kaohsiung (TW)

( * ) Notice: Subject to any disclaimer, the term of this patent is extended or adjusted under 35 U.S.C. 154(b) by 43 days.

(21) Appl. No.: 17/183,476

(22) Filed: Feb. 24, 2021

(65) Prior Publication Data
US 2021/0262160 A1   Aug. 26, 2021

(30) Foreign Application Priority Data

Feb. 24, 2020 (TW) ................... 109105906

(51) Int. Cl.
*D06N 3/04* (2006.01)
*D04H 3/16* (2006.01)
*D06N 3/00* (2006.01)

(52) U.S. Cl.
CPC .............. *D06N 3/045* (2013.01); *D04H 3/16* (2013.01); *D06N 3/0011* (2013.01); *D06N 3/0088* (2013.01); *D06N 2201/0254* (2013.01)

(58) Field of Classification Search
CPC .... D06N 3/045; D06N 3/0011; D06N 3/0088; D06N 2201/0254; D06N 2213/03;
(Continued)

(56) References Cited

U.S. PATENT DOCUMENTS

| 6,448,335 | B1 * | 9/2002 | Braga ................... C08L 23/16 |
|---|---|---|---|
| | | | 525/97 |
| 6,525,157 | B2 * | 2/2003 | Cozewith ............... C08L 53/00 |
| | | | 526/170 |

(Continued)

FOREIGN PATENT DOCUMENTS

| CN | 102497981 A | 6/2012 |
|---|---|---|
| CN | 103328565 B | 8/2015 |

(Continued)

OTHER PUBLICATIONS

English Language Translation of JP-2001049529-A (Year: 2001).*

*Primary Examiner* — Maria V Ewald
*Assistant Examiner* — Daniel P Dillon
(74) *Attorney, Agent, or Firm* — Joseph C. Zucchero; Carolyn S. Elmore; Elmore Patent Law Group, P.C.

(57) ABSTRACT

The present invention relates to an artificial leather and a method for producing the same. The artificial leather includes a substrate, a thermoplastic ethylene-propylene polymer elastic layer, and a surface layer. The substrate is formed from fibers having a first thermoplastic ethylene-propylene polymer. The surface layer is formed from a second thermoplastic ethylene-propylene polymer. The first thermoplastic ethylene-propylene polymer and the second thermoplastic ethylene-propylene polymer provide the substrate with a specific melting point and the surface layer with a specific melting point, respectively. By the substrate with the specific melting point and the surface layer with the specific melting point, the artificial leather has an excellent post-processability. Therefore, the artificial leather can have the substrate and the surface layer which have the same material, thereby having an excellent recyclability.

4 Claims, 4 Drawing Sheets

(58) Field of Classification Search
CPC .... D06N 3/0027; D06N 3/0077; D06N 3/007; D06N 3/10; D06N 3/04; D06N 3/0038; D06N 3/0097; D06N 2209/103; D06N 2209/1685; D04H 3/16
See application file for complete search history.

(56) References Cited

U.S. PATENT DOCUMENTS

| | | | | |
|---|---|---|---|---|
| 2010/0159771 A1* | 6/2010 | Fujisawa | .................. | B32B 5/26 |
| | | | | 442/370 |
| 2012/0108134 A1* | 5/2012 | Chee | ..................... | D06N 3/045 |
| | | | | 442/370 |
| 2013/0072623 A1* | 3/2013 | Krabbenborg | .......... | B32B 27/32 |
| | | | | 156/247 |

FOREIGN PATENT DOCUMENTS

| | | | |
|---|---|---|---|
| JP | 2001049529 A | * | 2/2001 |
| KR | 101913812 B1 | | 11/2018 |
| TW | I230216 B | | 4/2005 |
| WO | 2018093881 A1 | | 5/2018 |

\* cited by examiner

ARTIFICIAL LEATHER AND METHOD FOR PRODUCING THE SAME

RELATED APPLICATION

This application claims priority to an earlier Taiwan Application Serial Number 109105906, filed on Feb. 24, 2020 which is incorporated herein by reference in its entirety.

BACKGROUND

Field of Invention

The present invention relates to an artificial leather and a method for producing the same, and more particularly relates to an artificial leather having an excellent recyclability and a method for producing the same.

Description of Related Art

Traditionally, in shoemaking, artificial leathers of polyurethane (PU) and polyvinylchloride (PVC) are used as surface coating layers, and non-woven clothes of polyethylene terephthalate (PET) and nylon fiberic are used as a substrate. Because there are no recycling benefits for thermosetting resins (e.g. PVC), it needs to separate the surface coating layer and the substrate during processes for recycling waste materials and products. Thus, it induces problems of time wasting and lower recycling efficiency.

Now, it has been developed for a long time to uniformize materials of the surface coating layer and the substrate. However, it still suffers many difficulties to find the material to meet requirements of surface treatments of the surface coating layer. For example, there is a need for the surface coating layer to have surface texture produced by a molding process, and the surface coating layer should be compatible with a surface treatment agent to provide various and varied appearance. Besides, in a molding step of the surface coating layer, original surface textures of the substrate should be changeless when materials of the substrate is heated.

On the other hand, the developing thermoplastic resin as the surface coating layer still suffers problems of lower bending resistance or surface-wearing resistance. Therefore, it needs a new artificial leather and a method for producing the same to improve the previous disadvantages.

SUMMARY

In view of the above problems, an aspect of the present invention is to provide an artificial leather. The artificial leather includes a substrate, a thermoplastic ethylene-propylene copolymer elastic layer and a surface coating layer, wherein the substrate and the surface coating layer are made from thermoplastic ethylene-propylene copolymer. The thermoplastic ethylene-propylene copolymer provides the substrate and the surface coating layer specific melting points. By the substrate with a specific melting point and the surface coating layer with a specific melting point, the artificial leather of the present invention can have the substrate and the surface coating layer which have the same material, thereby having excellent recyclability.

Another aspect of the present invention is to provide a method for producing the artificial leather to produce the aforementioned artificial leather. According to an aspect of the present invention, the artificial leather is provided. The artificial leather comprises a substrate, a thermoplastic ethylene-propylene copolymer elastic layer disposed on the substrate, a surface coating layer disposed on the thermoplastic ethylene-propylene copolymer elastic layer. The substrate is formed from fibers, the aforementioned fibers have a first thermoplastic ethylene-propylene copolymer, and a melting point of the substrate is 60° C. to 200° C. The aforementioned surface coating layer is formed from a second thermoplastic ethylene-propylene copolymer, and a melting point of the surface coating layer is 60° C. to 200° C.

According to an embodiment of the present invention, the melting point of the aforementioned substrate is higher than the melting point of the aforementioned surface coating layer.

According to another embodiment of the present invention, a hardness of the aforementioned substrate is 50 A to 95 A.

According to another embodiment of the present invention, a thickness of the aforementioned surface coating layer is 0.01 nm to 0.05 nm.

According to another embodiment of the present invention, the aforementioned surface coating layer has a surface texture.

According to another embodiment of present invention, the aforementioned surface coating layer has a treated surface.

According to another aspect of the present invention, the method for producing the artificial leather is provided. In the aforementioned method, first fibers containing a first thermoplastic ethylene-propylene copolymer is meltblown to form a substrate, and a melting point of the substrate is 60° C. to 200° C. Then, a thermoplastic ethylene-propylene copolymeric elasteric layer is thermal bound with the substrate to form a stacked material. Then, a second thermoplastic ethylene-propylene copolymer is coated on a releasing material to form a surface coating layer, wherein a melting point of the aforementioned surface coating layer is 60° C. to 200° C. Next, the aforementioned stacked material is adhered with the aforementioned surface coating layer to produce the artificial leather, wherein the aforementioned thermoplastic ethylene-propylene copolymeric elasteric layer is located between the substrate and the surface coating layer.

According to an embodiment of present invention, a hardness of the aforementioned substrate is 50 A to 95 A.

According to an embodiment of present invention, after producing the aforementioned artificial leather, the aforementioned method for producing the artificial leather further comprises a molding step to form a surface texture on the surface coating layer, wherein a molding temperature of the molding step is 80° C. to 160° C.

According to another embodiment of present invention, after producing the aforementioned artificial leather, the aforementioned method for producing the artificial leather further comprises a treating step to form a treated surface on the surface coating layer.

In an application of the artificial leather and the method for producing the same of the present invention, the substrate and the surface coating layer are both formed from thermoplastic ethylene-propylene copolymers. The thermoplastic ethylene-propylene copolymer provides the substrate with the specific melting point and the specific hardness, and it provides the surface coating layer with the specific melting point. Therefore, the artificial leather can have the substrate and the surface coating layer which have the same material, thereby having excellent recyclability. Besides, the substrate with the specific hardness can enhance post-processability, bending resistance and surface-wearing resistance of the artificial leather.

BRIEF DESCRIPTION OF THE DRAWINGS

Now please refer to description below and accompany with corresponding drawings to more fully understand embodiments of the present invention and advantages thereof. It has to be emphasized that all kinds of characteristics are not drawn in scale and only for illustrative purpose. The description regarding to the drawings as follows.

DETAILED DESCRIPTION

A manufacturing and usage of embodiments of the present invention are discussed in detail below. However, it could be understood that embodiments provide much applicable invention conception which can be implemented in various kinds specific contents. The specific embodiments discussed are only for illustration, but not be a limitation of scope of the present invention.

Figure 1:
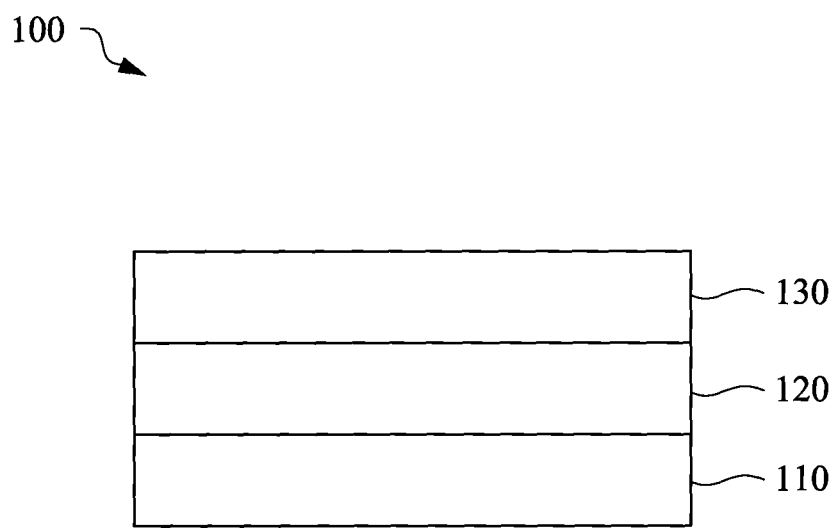
FIG. 1 illustrates a schematic diagram of a structure of an artificial leather according to an embodiment of the present invention.

Please refer to FIG. 1, it illustrates a schematic diagram of a structure of an artificial leather according to an embodiment of the present invention. The artificial leather 100 of the present invention comprises a substrate 110, a thermoplastic ethylene-propylene copolymer elastic layer 120 disposed on the substrate 110 and a surface coating layer 130 disposed on the thermoplastic ethylene-propylene copolymer elastic layer 120.

In the artificial leather 100 of the present invention, the substrate 110 is formed from fibers, and the fibers are formed from spinning a first thermoplastic ethylene-propylene copolymer. Besides, the surface coating layer 130 is formed from a second thermoplastic ethylene-propylene copolymer. Because, the thermoplastic ethylene-propylene copolymer is a thermoplastic material, the artificial leather 100 produced by the thermoplastic ethylene-propylene copolymer have recyclability.

In some embodiments, the first thermoplastic ethylene-propylene copolymer and the second thermoplastic ethylene-propylene copolymer can be identical ethylene-propylene copolymers, i.e. one kind of thermoplastic ethylene-propylene copolymer is used to produce the substrate 110 and the surface coating layer 130. In other embodiments, the first thermoplastic ethylene-propylene copolymer and the second thermoplastic ethylene-propylene copolymer can be two kinds of thermoplastic ethylene-propylene copolymer, i.e. different thermoplastic ethylene-propylene copolymers are used to produce the substrate 110 and the surface coating layer 130. The aforementioned difference between thermoplastic ethylene-propylene copolymers can be a degree of polymerization, functional groups of ethylene blocks and/or propylene blocks, introduction of other blocks and other factors.

Furthermore, a various appearance of the surface coating layer 130 is produced by surface treating processes. In treating processes, because solvents are used to dissolve the surface coating layer 130, it needs to heat the surface coating layer 130 for drying. A melting point of the substrate 110 can be higher than that of the surface coating layer 130 to prevent a texture of the substrate 110 from varying during the heating. For example, a melting point of the first thermoplastic ethylene-propylene copolymer can be higher than that of the second thermoplastic ethylene-propylene copolymer to allow the melting point of the substrate 110 to be higher than that of the surface coating layer 130.

In some embodiments, as mentioned above, the aforementioned two kinds of copolymers can have different melting points with varying the degree of polymerization or functional groups of ethylene blocks and/or propylene blocks, and/or introducing other blocks, therefore subjecting the melting point of the substrate 110 to be higher than that of the surface coating layer 130. For example, two kinds of ethylene-propylene copolymers with different degrees of polymerization are mixed to prepare a copolymer with a melting point between their melting points, thereby metting the requirement of the melting points of the substrate 110 and the surface coating layer 130.

In some embodiments, the melting points of the first thermoplastic ethylene-propylene copolymer and the second thermoplastic ethylene-propylene copolymer are 60° C. to 200° C., preferably are 100° C. to 190° C., and more preferably are 130° C. to 170° C. When the melting point of the first thermoplastic ethylene-propylene copolymer is not at a range of 60° C. to 200° C., the first thermoplastic ethylene-propylene copolymer can not subject the substrate 110 to have an appropriate melting point (i.e. 60° C. to 200° C.) and an appropriate hardness (i.e. 50A to 95 A). On the other hand, when the melting point of the second thermoplastic ethylene-propylene copolymer is not at a range of 60° C. to 200° C., the second thermoplastic ethylene-propylene copolymer can not subject the surface coating layer 130 to have an appropriate melting point (i.e. 60° C. to 200° C.).

In some embodiments, the melting point of the substrate 110 is 90° C. to 170° C., preferably is 100° C. to 160° C., and more preferably is 160° C. The melting point of the substrate 110 can influence deformation of the texture of the substrate 110 caused by the heating of the molding step. When the melting point of the substrate 110 is lower than 60° C., the texture of the substrate 110 is deformed from the heating of the molding step. Therefore, the artificial leather 100 does not have excellent post-processability. When the melting point of the substrate 110 is higher than 200° C., hand feeling of the artificial leather 100 is not good and it is slightly hard.

In some embodiments, the melting point of the surface coating layer 130 is 60° C. to 100° C., preferably is 70° C. to 90° C., and more preferably is 80° C. The melting point of the surface coating layer 130 can influence post-processability of the artificial leather 100. When the melting point of the surface coating layer 130 is lower than 60° C., the surface coating layer 130 is easily to be melted, such that disorderly and unrecognized textures are formed from the molding process. Therefore, the artificial leather 100 does not have excellent post-processability. When the melting point of the surface coating layer 130 is higher than 100° C., the surface coating layer 130 is hardly to be melted, such that the textures can not be formed from the molding process. Therefore, the artificial leather 100 does not have excellent post-processability. In another embodiments, when the melting point of the surface coating layer 130 is 60° C. to 100° C., the melting point of the surface coating layer 130 can further enhance post-processability of the artificial leather 100.

In some embodiments, a thickness of the surface coating layer 130 is 0.01 mm to 0.05 mm, preferably is 0.020 mm to 0.040 mm, and more preferably is 0.030 mm to 0.035 mm.

In some embodiments, a hardness (Shore A) of the substrate 110 is 50 A to 95 A, preferably is 55 A to 85 A, and more preferably is 65 A to 75 A. In general, as increasing of the hardness of the substrate 110, the bending resistance of the artificial leather 100 is much better, but on the contrary the bending resistance thereof is lower. As increasing of the hardness of the substrate 110, the surface-wearing resistance of the artificial leather 100 is much better, but on the contrary the surface-wearing resistance thereof is lower. When the hardness of the substrate 110 is 50 A to 95 A, the artificial leather 100 has excellent bending resistance and wear resistance. In some embodiments, the substrate 110 with the above hardness can facilitate the surface texture of the substrate 110 to maintain a original appearance during the heating of the molding process, thereby enhancing post-processability of the artificial leather 100.

To enhance the recyclability of the artificial leather 100, the material of the thermoplastic ethylene-propylene copolymer elastic layer 120 is the same as those of the substrate 110 and the surface coating layer 130.

Figure 2:
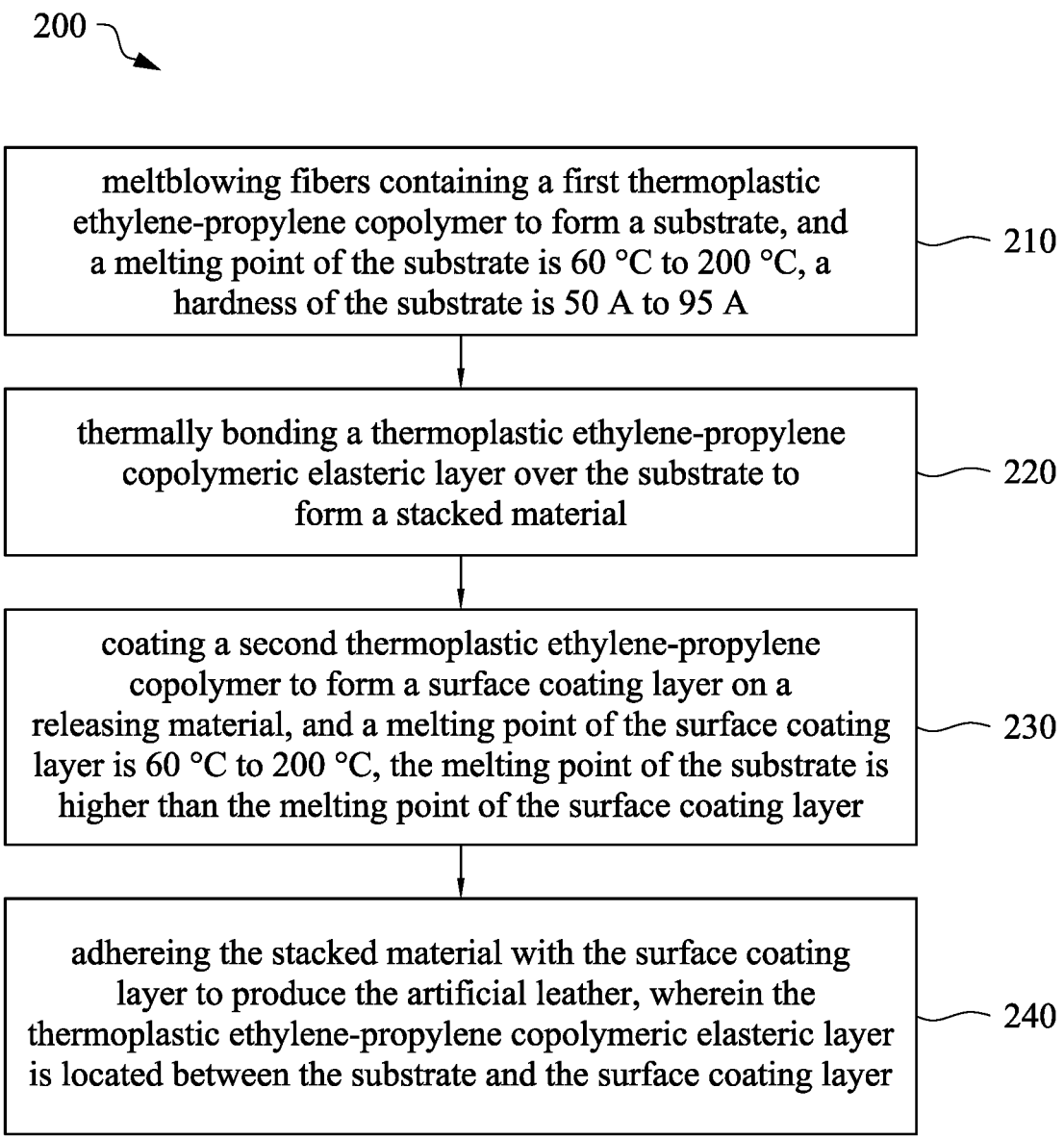
FIG. 2 illustrates a flow chart of a method for producing an artificial leather according to an embodiment of the present invention.

Please refer to FIG. 1 and FIG. 2. FIG. 2 illustrates a flow chart of a method for producing an artificial leather according to an embodiment of the present invention. In a method 200 for producing the artificial leather 100 of the present invention, containing fibers the first thermoplastic ethylene-propylene copolymer are firstly meltblown to form the substrate 100, as shown in step 210. In some embodiments, the meltblowning is performed from a melt blown machine, and the melting point of the substrate 110 is 60° C. to 200° C.

After the step 210 is performed, the thermoplastic ethylene-propylene copolymeric elasteric layer 120 is thermally bounded over the substrate 110 to form the stacked material, as shown in step 220. In some embodiments, the thermally bonding is performed from a stork crawler machine in the step 220. A temperature of the thermally bonding is 80° C. to 200° C., and preferably can be 100° C. to 160° C., and a pressure of the thermal binding is 4 to 10 kg/m².

After the step 220 is performed, the second thermoplastic ethylene-propylene copolymer is coated to form the surface coating layer 130 on the releasing material, and the melting point of the surface coating layer 130 is 60° C. to 200° C., as shown in step 230. In some embodiments, the second thermoplastic ethylene-propylene copolymer is coated on the releasing material by a coating machine, and backed at 80° C. to 130° C. to form the surface coating 130. Preferably, the backing temperature is 80° C. to 100° C.

After the step 230 is performed, the stacked material is adhered with the surface coating layer 130 to produce the artificial leather 100, and the thermoplastic ethylene-propylene copolymeric elasteric layer 120 is located between the substrate 110 and the surface coating layer 130, as shown in step 240. In some embodiments, the adhesive temperature is 80° C. to 200° C., preferably is 100° C. to 160° C., a speed of the adhesion is 1 m/min to 10 m/min, and pressure of the adhesion is 30 kg to 100 kg.

Figure 3:
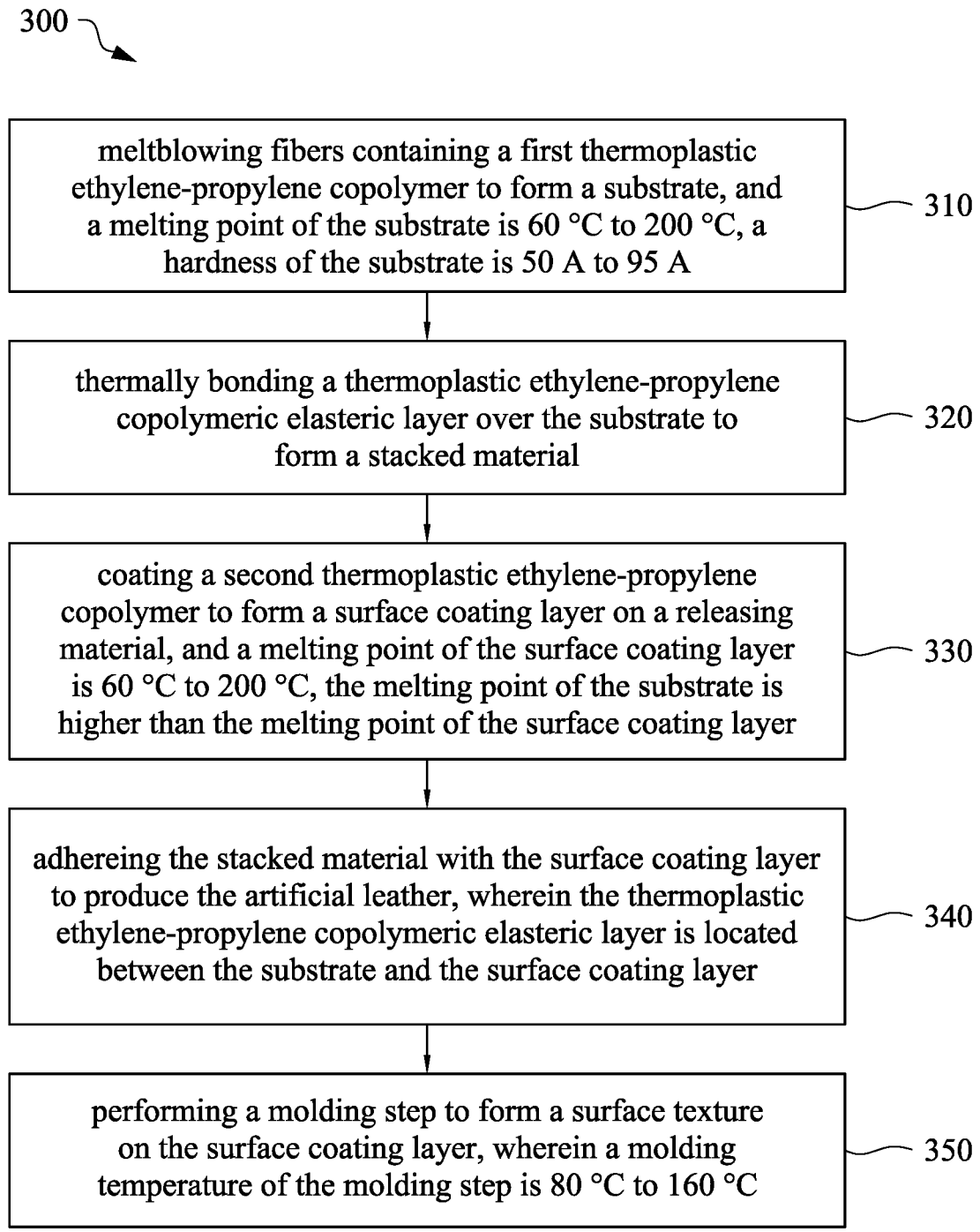
FIG. 3 illustrates a flow chart of a method for producing an artificial leather according to other embodiment of the present invention.

Please refer to FIG. 1 and FIG. 3. FIG. 3 illustrates a flow chart of a method for producing an artificial leather according to other embodiment of the present invention. A method 300 for producing an artificial leather 100 is substantially similar to the method 200, and differences therebetween reside in that after the artificial leather 100 is produced (i.e. step 340 of the method 300), a molding process (step 350) is further performed on the artificial leather 100 to form the surface texture on the surface coating layer 130 of the artificial leather 100.

The first thermoplastic ethylene-propylene copolymer used to form the substrate 110 can influence the temperature of the molding process. As increasing of the melting point of the first thermoplastic ethylene-propylene copolymer, the temperature of the molding process is much higher, but on the contrary the temperature thereof is lower. Besides, a molding temperature of the molding process should be lower than the heat-resistant temperature (e.g. a thermal degradation temperature) of the substrate 110.

For example, the molding temperature of the molding process in the molding step (step 350) is 80° C. to 160° C., preferably is 90° C. to 140° C., and more preferably is 90° C. to 100° C. A molding rate of the molding process can be 1 m/min to 5 m/min, preferably be 3 m/min to 8 m/min, and more preferably be 5 m/min to 10 m/min.

Figure 4:
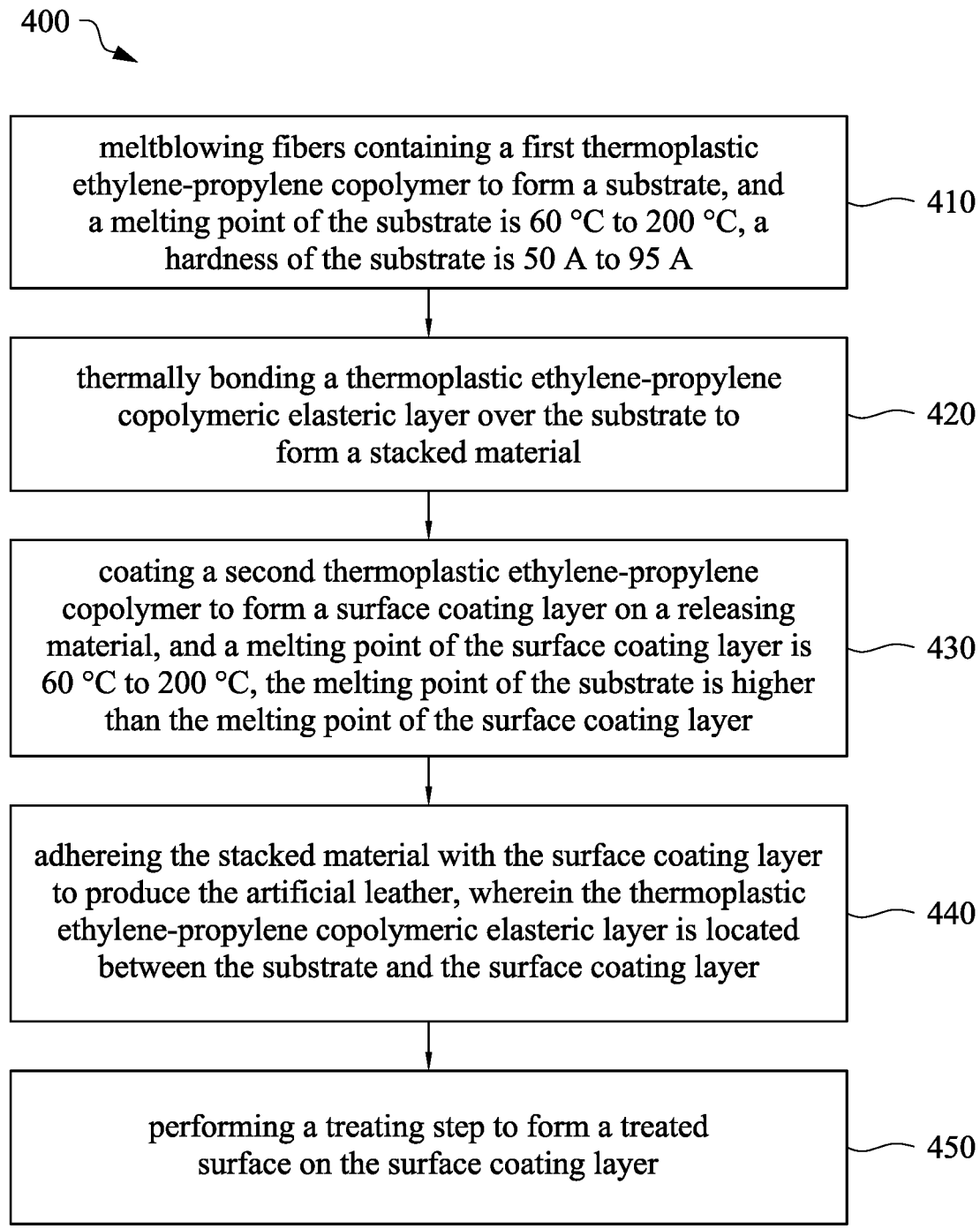
FIG. 4 illustrates a flow chart of a method for producing an artificial leather according to another embodiment of the present invention.

Please refer to FIG. 1 and FIG. 4. FIG. 4 illustrates a flow chart of a method for producing an artificial leather according to another embodiment of the present invention. A method 400 for producing an artificial leather 100 is substantially similar to the method 200, and differences therebetween reside in that after the artificial leather 100 is produced (i.e. step 440 of the method 400), a treating process (step 450) is further performed on the artificial leather 100 to form a treated surface on the surface coating layer 130 of the artificial leather 100.

In some embodiments, the treating process can comprise haziness and colored water modification and other treatments. In some embodiments, the treating process can be performed with surface treatment agents, and the surface treatment agents can be thermoplastic surface treatment agents, thermosetting surface treatment agents, and the like. For example, polyurethane-resin based or ethylene-propylene-copolymer based surface treatment agents. When the surface treatment agents having the same material as the substrate 110 and the surface coating layer 130 are used, the following step for removing the surface coating layer 130 can be omitted, thereby enhancing the recycling efficiency of the artificial leather 100. Thus, the surface treatment agents are preferably ethylene-propylene copolymer.

The following embodiments are used to illustrated the applications of the present invention, but they are not used to limit the present invention, it could be made various changes or modifications for a person having ordinary sill in the art without apart from the inspire and scope of the present invention. Production of artificial leather Embodiment 1

A elastomer of a first thermoplastic ethylene-propylene copolymer is drawn to prepare non-woven cloth. A melt blown machine is used to meltblown. Then, a stork crawler machine is used to thermally bond thermoplastic ethylene-propylene copolymer elastic layer with the aforementioned non-woven cloth (i.e. substrate). A temperature of thermal adhesion is 100° C. to 160° C., and a pressure of the thermal adhesion is 4 kg/m² to 10 kg/m².

A dry coating machine is used to coat a second thermoplastic ethylene-propylene copolymer on a releasing paper, the second thermoplastic ethylene-propylene copolymer is backed at 80° C. to 140° C., then to form a surface coating layer, and a thickness of the surface coating layer is 0.03 mm.

A embossing equipment is used to transfer texture to the aforementioned surface coating layer. In the transferring process, a temperature is 80° C. to 160° C., a rate is 1 m/min to 10 m/min, a pressure is 30 kg to 100 kg, so as to form an artificial leather having surface texture.

Embodiments 2 to 4 and Comparative Embodiment 1

Embodiments 2 to 4 and Comparative embodiment 1 are practiced with similar method as in Embodiment 1 by using substrates with different melting points and hardness and surface coating layers with different melting points. Specific conditions of Embodiments 2 to 4 and Comparative Embodiment 1 are shown in Table 1.

TABLE 1

|  |  | Embodiment 1 | Embodiment 2 | Embodiment 3 | Embodiment 4 | Comparative embodiment 1 |
|---|---|---|---|---|---|---|
| Substrate | Melting point(° C.) | 100 | 119 | 160 | 160 | 118 |
|  | Hardness (A) | 64 | 60 | 72 | 84 | 49 |
| Surface coating layer | Melting point (° C.) | 70-90 | 70-90 | 70-90 | 70-90 | 70-90 |

Evaluation Methods
1. Post-Processability

After the artificial leather is molded by the embossing machine, the post-processability is evaluated by observing appearance of the molded artificial leather with eyes, and the post-processability is evaluated according to conditions of surface textures, and the specific criterions are shown as below:

◎: the surface texture of the artificial leather is very clear and its appearance is intact.

○: the surface texture of the artificial leather is very clear.

Δ: the surface texture of the artificial leather is very disordly but can be recognized.

X: the surface texture of the artificial leather is not produced or too disordly to be recognized.

2. Bally Flex

Bally flex (bending resistance) is evaluated based on the Starland Method (SATRA PM55). After the artificial leather undergoes 100,000 times bending, the appearance of the artificial leather is observed with naked eye, the bending resistance is evaluated according to the appearance of the artificial leather, and the specific criterions are shown as below:

◎: the appearance of the artificial leather maintains the original shape.

○: the appearance of the artificial leather exhibits slight wrinkles.

Δ: the appearance of the artificial leather exhibits significant wrinkles.

X: the appearance of the artificial leather exhibits cracks.

3. Surface-Wearing Resistance

Surface-wearing resistance is measured based on the Starland Method (ASTM D3885), then the artificial leather is evaluated according to the results of the surface-wearing resistance, and the specific criterions are shown below:

◎: wear resistance is excellent.
○: wear resistance is good.
Δ: wear resistance is poor.
X: wear resistance is bad.

TABLE 2

| Evaluation items | Embodiment 1 | Embodiment 2 | Embodiment 3 | Embodiment 4 | Comparative embodiment 1 |
|---|---|---|---|---|---|
| Post-processability | ◎ | ◎ | ◎ | ○ | Δ |
| Bending resistance | Δ | Δ | ○ | ○ | X |
| Surface-wearing resistance | ○ | ○ | ◎ | ◎ | Δ |

Please refer to Table 2, it shows the results obtained by evaluation methods above according to every embodiment and comparative embodiment of the artificial leathers of the present invention. In comparison with the artificial leather produced by 49 A of hardness of the surface coating layer of Comparative embodiment 1, the artificial leathers produced by Embodiments 1 to 4 have better post-processability, bending resistance and surface-wearing resistance. According to the aforementioned results, the surface coating layer with the specific melting point and the substrate with the specific hardness and the specific melting point can improve post-processability, bending resistance and surface-wearing resistance of the artificial leathers.

In summary, in the artificial leather and the method for producing the same of the present invention, the substrate and the surface coating layer are both made by thermoplastic ethylene-propylene copolymers. The thermoplastic ethylene-propylene copolymers provide the substrate with the specific melting point and hardness and the surface coating layer with the specific melting point. With the substrate and the surface coating layer with specific melting points, the artificial leather can have excellent post-processability, and the artificial leather can have the substrate and the surface coating layer formed from the same type of materials. Accordingly, there is no need to perform additional operation to separate different materials for the artificial leather of the present invention, such that the artificial leather of the present invention has excellent recyclability. Besides, the substrate with the specific hardness can enhance post-processability, bending resistance and surface-wearing resistance of the artificial leather of the present invention.

Although the present invention has been disclosed in several embodiments as above mentioned, these embodiments do not intend to limit the present invention. Various changes and modifications can be made by those of ordinary skills in the art of the present invention, without departing from the spirit and scope of the present invention. Therefore, the claimed scope of the present invention shall be defined by the appended claims.

What is claimed is:

1. An artificial leather, comprising: a substrate, wherein the substrate is formed from fibers, the fibers have a first thermoplastic ethylene-propylene copolymer, and a melting point of the substrate is 125° C. to 152° C., a hardness of the substrate is 70 A; a thermoplastic ethylene-propylene copolymeric elastic layer, disposed on the substrate; and a surface coating layer, disposed on the thermoplastic ethylene-propylene copolymeric elastic layer, wherein the surface coating layer is formed from a second thermoplastic ethylene-propylene copolymer, and a melting point of the surface coating layer is 60° C. to 100° C., the melting point of the substrate is higher than the melting point of the surface coating layer.

2. The artificial leather of claim 1, wherein a thickness of the surface coating layer is 0.01 mm to 0.05 mm.

3. The artificial leather of claim 1, wherein the surface coating layer has a surface texture.

4. The artificial leather of claim 1, wherein the surface coating layer has a treated surface.

\* \* \* \* \*